Aug. 15, 1944.　　　　K. E. FOUTZ　　　　2,355,721

BRAKE CYLINDER DEVICE

Filed Oct. 22, 1942

INVENTOR
Karl E. Foutz
BY
ATTORNEY

UNITED STATES PATENT OFFICE 2,355,721

BRAKE CYLINDER DEVICE

Karl E. Foutz, McKeesport, Pa., assignor to The Westinghouse Air Brake Company, Wilmerding, Pa., a corporation of Pennsylvania Application October 22, 1942, Serial No. 462,913

4 Claims. (Cl. 60—62.6)

This invention relates to fluid pressure brakes, and more particularly to a brake cylinder for a fluid pressure brake equipment.

In its usual form the brake cylinder employed for applying braking force to the wheels of a railway vehicle comprises a cylindrical casing, a piston mounted therein and having a hollow or tubular piston rod, and a coil spring surrounding the hollow rod and interposed between the piston and the non-pressure head of the brake cylinder. The coil spring is necessarily of considerable length, and unless provided with support in addition to that afforded by the piston and the end wall of the non-pressure head, it tends to vibrate or buckle into engagement with the hollow piston rod under certain operating conditions. In practice, the coils of brake cylinder piston return springs have in some cases caused damage to the associated piston rods necessitating replacement of those elements, and of the sealing rings associated therewith for excluding dirt from the brake cylinders.

It is a principal object of my invention to provide an improved brake cylinder construction embodying a light weight non-pressure head having formed thereon a plurality of spaced ribs, which are adapted to support the associated return spring and to constitute means for strengthening the brake cylinder as a whole.

Another object of the invention is to provide an improved brake cylinder head which may readily be constructed of sheet steel, and which has a plurality of indented spring supporting portions extending in parallel relation throughout its length.

Figure 1:
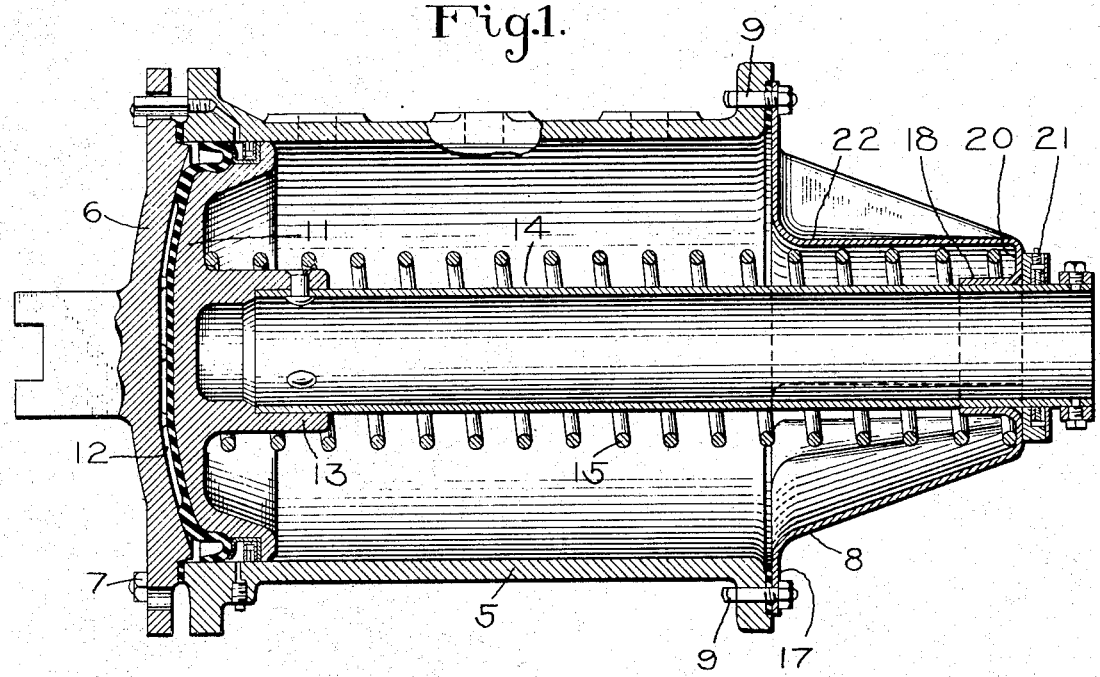
Figure 2:
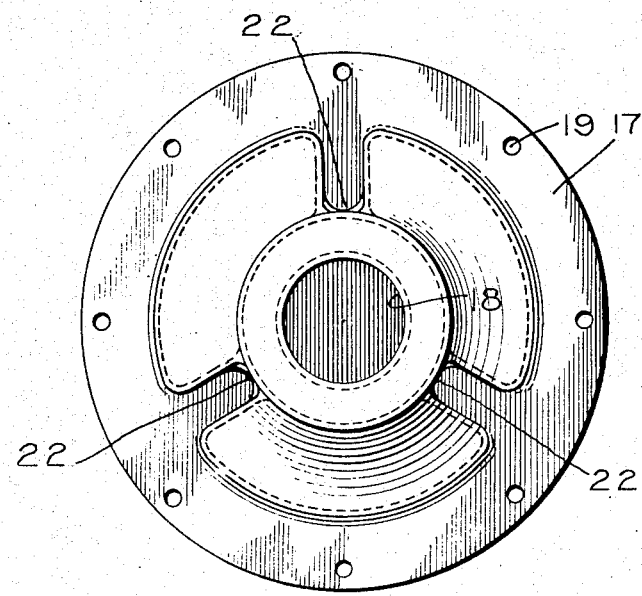

Other objects and advantages of the invention will appear in the following more detailed description thereof, taken in connection with accompanying drawing, in which Fig. 1 is a sectional view of a brake cylinder having a head section constructed in accordance with the invention; and Fig. 2 is an end view of the non-pressure head shown in Fig. 1.

A brake cylinder embodying the invention is a preferred form as illustrated in Fig. 1, and comprises a cylindrical body 5, a pressure head 6 secured to the body by means of bolts 7, and a non-pressure head 8, which is secured to the opposite end of the body by means of bolts 9 and embodies certain novel features of construction hereinafter described. Mounted within the body 5 is a piston 11 which has formed at one side thereof a pressure chamber 12 and which has a central collar 13 to which is riveted a tubular piston rod 14 extending outwardly of the casing structure. A coil spring 15 is provided for biasing the piston 11 toward the normal brake release position, as shown in Fig. 1.

The non-pressure head 8 is preferably made of sheet steel, and comprises a frusto-conical central portion having formed at the larger end an annular flange 17, and terminating at the smaller end in an inverted annular lip portion 18, which defines an opening through which extends the tubular piston rod 14. Suitable apertures 19 are provided in the flange 17 for receiving the mounting bolts 9, as shown in Fig. 2. A flat annular wall 20 is formed on the head structure adjacent the inverted lip portion 18, and serves to retain the adjacent end of the coil spring 15. Carried on the outer side of the wall 20 is the usual sealing ring assembly 21, which is constructed and arranged to minimize access of dirt into the brake cylinder.

According to the invention, the non-pressure head 8 is provided with means having the dual function of furnishing structural rigidity thereto while guiding and preventing displacement of the spring 15, which means comprises a plurality of longitudinally indented channels or ribs 22, which are pressed or otherwise formed in radial relation in the conical central portion of the head 8. In the illustrated form of the invention, three of these rib portions are provided, the inner walls thereof being disposed parallel to and closely adjacent the coils of the spring 15, thus affording support therefor at points spaced about 120 degrees apart. It will be apparent that the spaced ribs 22 are at the same time adapted to render the non-pressure head more resistant to stresses tending to distort it, so that adequate rigidity of the head is insured notwithstanding the relatively light material used in its construction.

A non-pressure head for a brake cylinder which is constructed after the manner of the invention, as now disclosed, is thus provided with parallel reenforcing ribs extending closely adjacent the piston return spring for limiting vibration or buckling of that member, so that the spring is effectively prevented from hammering or scoring the piston rod. Inasmuch as the ribs are adapted to engage the spring only at spaced points, no frictional or other undesirable interference with normal operation of the elements of the brake cylinder can be produced.

Having now described my invention, what I claim as new and desire to secure by Letters Patent is:

1. In a brake cylinder, in combination, a cylinder body, a piston mounted therein and having a piston rod, a return spring for the piston, and a non-pressure head secured to said cylinder body, said head having an aperture through which said rod extends and a plurality of longitudinal reenforcing corrugations extending inwardly closely adjacent and in supporting relation with coils of said return spring.

2. In a brake cylinder, in combination, a cylinder body, a piston mounted therein and having a piston rod, a return spring for the piston, and a non-pressure head secured to said cylinder body, said head being formed of sheet steel and having a plurality of spaced, longitudinally indented reenforcing folds or ribs pressed thereon for confining and preventing lateral displacement of coils of said return spring.

3. In a brake cylinder, in combination, a cylinder body, a piston mounted therein and having a piston rod, a return spring for the piston, and a non-pressure head secured to said cylinder body, said head comprising a frusto-conical portion terminating in an inverted lip portion defining an aperture through which said piston rod is slidably disposed, said lip portion providing an annular recess for receiving the end of said return spring, and a plurality of thin radially projecting interior ribs formed on said frusto-conical portion, said ribs presenting narrow spring supporting surfaces parallel to the axis of said return spring for limiting lateral displacement thereof.

4. A non-pressure head for the brake cylinder of an air brake system, comprising a frusto-conical body having an annular clamping flange formed on the larger end and terminating at the smaller end in an inverted lip portion defining an annular recess for receiving the end of a piston return spring, and at least three inwardly projecting radial fold portions formed on said body and presenting parallel spring supporting surfaces extending longitudinally from points on the circumference of the said annular recess.

KARL E. FOUTZ.